United States Patent [19]
Hyrcyk et al.

[11] Patent Number: 5,122,166
[45] Date of Patent: Jun. 16, 1992

[54] REMOVAL OF VOLATILE COMPOUNDS AND SURFACTANTS FROM LIQUID

[75] Inventors: Orest Hyrcyk, Syracuse, N.Y.; Lubomry Kurylko, New Providence, N.J.; Lawrence K. Wang, Latham, N.Y.

[73] Assignee: International Environmental Systems, Inc., Pittsfield, Mass.

[21] Appl. No.: 550,377

[22] Filed: Jul. 10, 1990

[51] Int. Cl.⁵ .................... B01D 19/00; B01D 53/04
[52] U.S. Cl. ................................... 55/38; 55/47; 55/51; 55/53; 55/74; 55/196; 55/387; 210/631
[58] Field of Search ............... 55/38, 44, 47, 51, 53, 55/68, 74, 75, 159, 387, 389; 210/631

[56] References Cited

U.S. PATENT DOCUMENTS

| | | | |
|---|---|---|---|
| 3,946,534 | 3/1976 | Egly | 55/38 X |
| 4,323,372 | 4/1982 | Bentz et al. | 55/68 X |
| 4,623,464 | 11/1986 | Ying et al. | 210/631 X |
| 4,689,054 | 8/1987 | Vara et al. | 55/74 X |
| 4,715,965 | 12/1987 | Sigerson et al. | 55/74 X |
| 4,752,306 | 6/1988 | Henriksen | 55/38 |
| 4,820,318 | 4/1989 | Chang et al. | 55/68 |
| 4,846,852 | 7/1989 | Schweitzer et al. | 55/74 X |
| 4,859,216 | 8/1989 | Fritsch | 55/74 X |
| 4,892,664 | 1/1990 | Miller | 55/53 X |
| 4,937,004 | 6/1990 | Mandrin et al. | 55/53 X |
| 4,966,611 | 10/1990 | Schumacher et al. | 55/74 X |

FOREIGN PATENT DOCUMENTS 2127711 4/1984 United Kingdom .................. 55/47

OTHER PUBLICATIONS

O'Brien, R. P. and J. L. Fisher, "There is an Answer to Groundwater Contamination", Water/Engineering & Management, May 1983.
O'Brien, R. P. and M. H. Stenzel, "Combining Granular Activated Carbon and Air Stripping", Public Works, Dec., 1984.
Stenzel, M. H. and U. S. Gupta, "Treatment of Contaminated Groundwaters with Granular Activated Carbon and Air Stripping," Journal of the Air Pollution Control Assoc., Dec., 1985.

Primary Examiner—Robert Spitzer
Attorney, Agent, or Firm—Lawrence K. Wang

[57] ABSTRACT

A process system for removal of toxic volatile organic compounds (VOCs) from contaminated groundwater is described. This process system involves groundwater pumping, groundwater treatment by air stripping in an enclosed sparging aeration chamber, air purification by granular activated carbon contactor, and recycling of GAC-purified air for further groundwater treatment by air stripping. The process system is cost-effective and eliminates the problem of secondary air contamination caused by conventional air stripping process.

8 Claims, 1 Drawing Sheet

REMOVAL OF VOLATILE COMPOUNDS AND SURFACTANTS FROM LIQUID

The present invention relates to a process system for treating contaminated groundwater to remove volatile organic compounds (VOCs) and other objectionable volatile contaminants from said groundwater. The process system of this invention represents a low cost and highly efficient alternative to present groundwater treatment technology which causes secondary air pollution.

About 70 percent of potable water in the U.S.A. is supplied by groundwater. Groundwater contamination, which is a national major concern, is about 71 percent caused by industrial accidents (chemical spills, tank leaks, etc.), 16 percent caused by railroad or truck's chemical accidents, and 13 percent caused by leachates from lagoons or dumpsites.

The primary reasons for treating groundwater are: potable use (39 percent), clean-up of aquifer to prevent spread of contamination (48 percent), and industrial and commercial use (13 percent). In any case, the potentially hazardous VOCs must be removed. Timely clean-up of aquifer to prevent spread of contamination is extremely important because the damage can be beyond repair if the spread of contamination is too wide.

Toxic organic compounds commonly found in groundwater include, but will not be limited to, the following:

| Organic Compounds in Groundwater | Percent of Occurrences | Concentration Range |
| --- | --- | --- |
| Carbon tetrachloride | 5 | 130 ug/l-10 mg/l |
| Chloroform | 7 | 20 ug/l-3.4 mg/l |
| Dibromochloropropane | 1 | 2-5 mg/l |
| DDD | 1 | 1 ug/l |
| DDE | 1 | 1 ug/l |
| DDT | 1 | 4 ug/l |
| CIS-1,2-dichloroethylene | 11 | 5 ug/l-4 mg/l |
| Dichloropentadiene | 1 | 450 ug/l |
| Diisopropyl ether | 3 | 20-34 ug/l |
| Tertiary methyl-butylether | 1 | .33 ug/l |
| Diisopropyl methyl phosphonate | 1 | 1,250 ug/l |
| 1,3-dichloropropene | 1 | 10 ug/l |
| Dichlorethyl ether | 1 | 1.1 mg/l |
| Dichloroisopropylether | 1 | 0.8 mg/l |
| Benzene | 3 | 0.4-11 mg/l |
| Acetone | 1 | 10-100 ug/l |
| Ethyl acrylate | 1 | 200 mg/l |
| Trichlorotrifloroethane | 1 | 6 mg/l |
| Methylene chloride | 3 | 1-21 mg/l |
| Phenol | 3 | 63 mg/l |
| Orthochlorophenol | 1 | 100 mg/l |
| Tetrachloroethylene | 13 | 5 ug/l-70 mg/l |
| Trichloroethylene | 20 | 5 ug/l-16 mg/l |
| 1,1,1-trichloroethane | 8 | 60 ug/l-25 mg/l |
| Vinylidiene chloride | 3 | 5 ug/l-4 mg/l |
| Toluene | 1 | 5-7 mg/l |
| Xylenes | 4 | 0.2-10 mg/l |
| EDB | 1 | 10 ug/l |
| Others | 1 | NA |

The state-of-the-art technologies for groundwater treatment include: air stripping without air emission control, granular activated carbon, chemical oxidation, and biological processes. Air stripping without air emission control is not acceptable in many states. Granular activated carbon contactor is technically feasible for water purification, but may be economically unfeasible when it is used alone. Chemical oxidation is not cost-effective and may give undesirable residuals. Biological process is very efficient for removal of organic contaminants, but requires through disinfection.

The present invention is an efficient and cost-effective groundwater purification system which considers the affordability, performance, governmental acceptance, secondary pollution elimination and simplicity in operation.

SUMMARY OF THE INVENTION

In accordance with the present invention, an improved process system and an apparatus for removing volatile organic compounds (VOCs) from a contaminated groundwater comprise the following steps, facilities, and alterations:

pumping the contaminated groundwater to an enclosed sparging aeration chamber which is completely sealed during aeration operation and has the following parts: a groundwater inlet, a groundwater outlet, an air inlet, a sparger system, a vacuum breaker, a manhole, and an enclosure, adjusting the hydraulic residence time of said chamber to conform to different influent groundwater flow rates, controlling said chamber of modular tank under slightly negative pressure in water, and providing sufficient air head space above water level in said chamber, bubbling air up from said sparger system located at bottom of said chamber through water phase using a low pressure and low volume air mover, entraining volatile organic compounds (VOCs) from aqueous phase into vapor phase when air bubbles are passing through said water phase, exiting the air containing VOCs from said chamber, passing through a demister pad to remove water droplets, and entering a granular activated carbon (GAC) contactor, absorbing VOCs from said air stream by said GAC contactor, exiting the purified air from said GAC contactor and recycling the purified air to said enclosed sparging aeration chamber for continuous groundwater purification, thus eliminating air emissions, or secondary pollution, treating the groundwater for a specific residence time, and exiting the air sparged groundwater from said enclosed sparging aeration chamber through said groundwater outlet with a trap which prevents external air intrusion into said chamber, further treating the air sparged groundwater or discharging said air sparged groundwater, determining the present invention's efficiency based on the air samples taken from the inlet and outlet sampling ports of said GAC contactor for analysis, and periodically replacing the exhausted GAC in said GAC contactor with virgin GAC and/or regenerated GAC.

DESCRIPTION OF THE PREFERRED EMBODIMENTS

Figure 1:
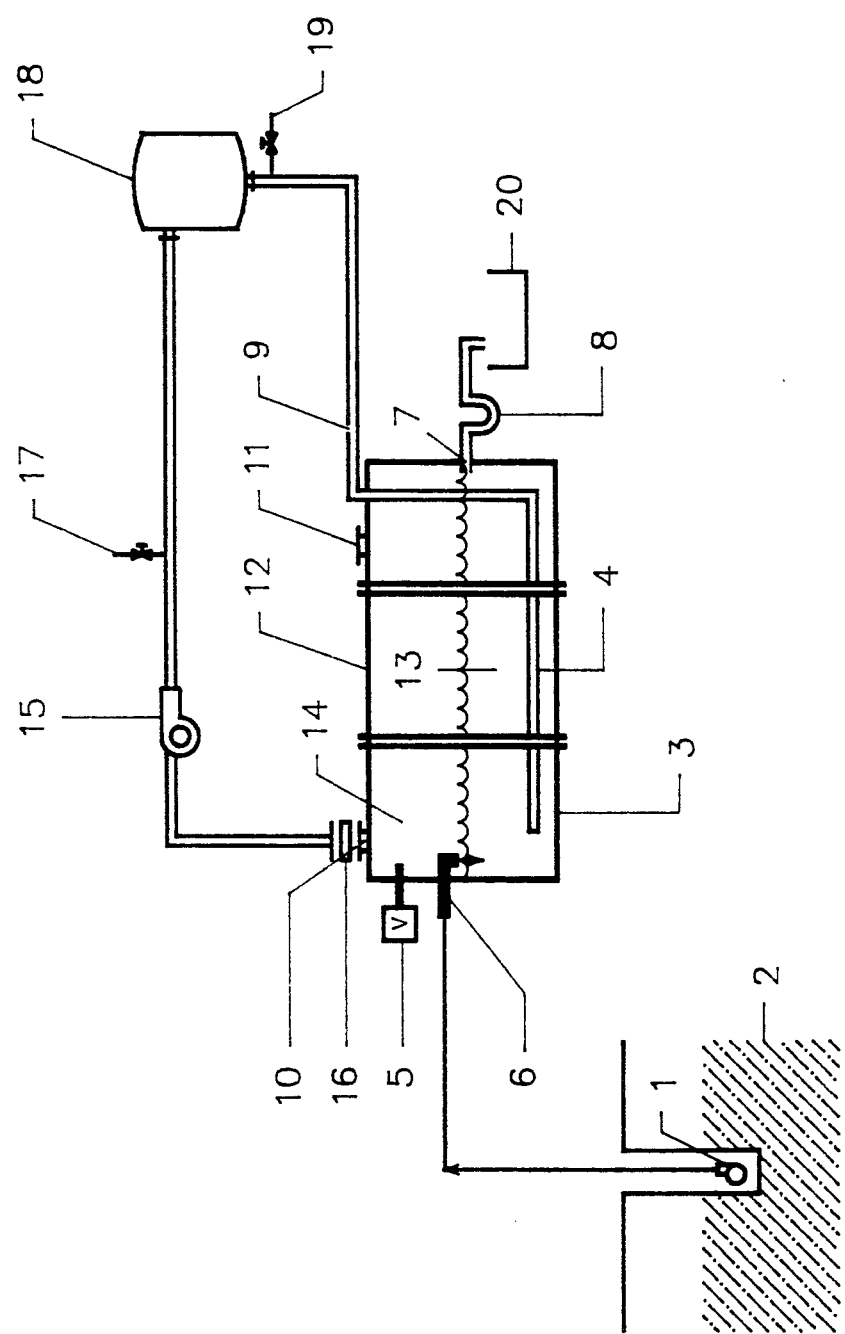

FIG. 1 is a schematic diagram of the present invention.

Referring to the FIGURE, a groundwater sump pump, 1 feeds the contaminated groundwater 2 into an enclosed sparging aeration chamber 3, which is equipped with a sparger system 4, a vacuum breaker 5, a groundwater inlet 6, a groundwater outlet 7 with trap 8, an air inlet 9 to sparger system 4, an air outlet 10, a manhole with cover 11, and an enclosure 12.

The enclosing sparging aeration chamber 3 is constructed to provide sufficient air head space above water level in said chamber. Air bubbles generated from said sparger system 4 passing through groundwater 13 inside said chamber 3 entrains volatile organic compounds (VOCs) from groundwater phase 13 into air phase 14.

The air 14 in said chamber 3 containing VOCs is sucked by an air mover 15, and passes through said air outlet 10 and a demister pad 16 to remove water droplets.

The preferred air mover 15 is of low pressure (5 to 15 psi) and low volume (500 to 1500 scfm) type for air movement throughout entire process system.

The dehumidified air is sampled at an inlet sampling port 17 before it is purified by a granular activated carbon (GAC) contactor 18.

The GAC purified air stream is sampled at an outlet sampling port 19, and is recycled to said enclosed sparging aeration chamber 3 via said air inlet 9 and said sparger system 4 for continuous groundwater purification.

The purified groundwater in said chamber flows through the groundwater outlet 7 and a trap 8 and is either further treated by a liquid phase GAC contactor 20, or discharged as the final effluent.

Entire air sparging and recycling system is completely enclosed, thus eliminating air emissions or secondary pollution.

We claim:

1. A process system for removing volatile organic compounds (VOCs) from aqueous phase by low pressure and low volume air sparging in an enclosed, sealed chamber, and subsequently from vapor phase by granular activated carbon (GAC) comprises the steps, parts and alterations of:

pumping the contaminated groundwater to an enclosed sparging aeration chamber which is completely sealed during aeration operation and has the following parts: a groundwater inlet, a groundwater outlet, an air inlet, a sparger system, a vacuum breaker, a manhole, and an enclosure, adjusting the hydraulic residence time of said chamber to conform to different influent groundwater flow rates, controlling said chamber under slightly negative pressure in water, and providing sufficient air head space above water level in said chamber, bubbling air up from said sparger system located at bottom of said chamber through water phase using a low pressure and low volume air mover, entraining volatile organic compounds (VOCs) from water phase into vapor phase when air bubbles are passing through said water phase, exiting the air containing VOCs from said chamber, passing through a demister pad to remove water droplets, and entering a gas phase granular activated carbon (GAC) contactor, adsorbing VOCs from said air stream by said gas phase GAC contactor, exiting the purified air from said gas phase GAC contactor and recycling the purified air to said enclosed sparging aeration chamber for continuous groundwater purification, thus eliminating air emissions, or secondary pollution, treating the groundwater for a specific residence time, and exiting the air sparged groundwater from said aeration chamber through said groundwater outlet with a trap which prevents external air intrusion into said chamber, further treating the air sparged groundwater (chamber effluent) or discharging said air sparged groundwater as the purified groundwater, determining the present invention's efficiency based on the air samples taken from the inlet and outlet sampling ports of said gas phase GAC contactor for analysis, and periodically replacing the exhausted GAC in said gas phase GAC contactor with virgin GAC and/or regenerated GAC.

2. The process system of claim 1 wherein the contaminated groundwater is water or wastewater contaminated with volatile organic compounds (VOCs) and other volatile impurities.

3. The process system of claim 1 wherein the enclosed sparging aeration chamber is easily mobilized and demobilized due to its modular design.

4. The process system of claim 1 wherein the purified groundwater or chamber effluent is further treated by a liquid phase GAC contactor.

5. The process system of claims 1 wherein the GAC is replaced by the treated granular adsorbents, activated alumina, ion exchange resin, manganese oxide, magnesium oxide, calcite, dolomite, or combinations thereof.

6. An apparatus for removing VOCs from a contaminated groundwater comprises the steps, parts, and alterations of:

a pump for pumping the contaminated groundwater into said apparatus, an enclosed sparging aeration chamber which is connected to said pump, receives the contaminated groundwater for treatment and has the following parts: a groundwater inlet, a groundwater outlet with a trap, an air inlet, a sparger system, a vacuum breaker, a manhole with cover, and an enclosure, an adjuster to adjust the hydraulic residence time of said chamber to conform to different influent groundwater flow rates, a control together with said vacuum breaker to operate said chamber under slightly negative pressure and to provide sufficient air head space above water level in said chamber, a sparger system which is connected to said air inlet and located at bottom of said chamber, for bubbles distribution, a low pressure and low volume air mover which is connected to a demister pad and said air outlet, for bubbling air bubbles through said water phase for entraining volatile organic compounds (VOCs) from aqueous phase into vapor phase inside said chamber, an air outlet which is connected to said enclosure to allow the air stream containing VOCs to exit from said chamber, a demister pad which is connected to said air outlet and said air mover, for removal of water droplets from the emitted air stream, a gas phase granular activated carbon (GAC) contactor which is connected to said air mover for removal of VOCs from said emitted air stream, an air pipe which is connected to said GAC contactor for exiting the purified air from said gas phase GAC contactor and for recycling the purified air to said enclosed sparging aeration chamber for continuous groundwater purification, an enclosure which covers said chamber, thus eliminating air emissions or secondary pollution, a groundwater outlet which exits the treated groundwater from said chamber after a specific residence time, a trap which is connected to said groundwater outlet and prevents external air intrusion into the chamber, a unit for further treatment of the purified groundwater from said chamber, the inlet and outlet sampling ports of the gas phase GAC contactor for determination of the present invention's efficiency for VOCs reduction, and means for periodical replacement of exhausted GAC with virgin GAC and/or regenerated GAC.

7. The apparatus of claim 6 wherein the enclosed sparging aeration chamber is of modular construction to be adjusted for treating various hydraulic flow rates.

8. The apparatus of claim 6 wherein the GAC is replaced by the treated granular adsorbents, activated alumina, ion exchange resin, manganese oxide, magnesium oxide, calcite, dolomite, or combinations thereof.

* * * * *

UNITED STATES PATENT AND TRADEMARK OFFICE
CERTIFICATE OF CORRECTION

PATENT NO. : 5,122,166
DATED : June 16, 1992
INVENTOR(S) : Orest Hrycyk, Lubomyr Kurylko, Lawrence K. Wang It is certified that error appears in the above-indentified patent and that said Letters Patent is hereby corrected as shown below:

On the title page, Item [19] United States Patent, should read -- Hrycyk et al --.

Item [75] Inventors:"Orest Hrycyk, Syracuse, N.Y.; Lubomyr Kurylko, New Providence, N.J.; Lawrence K. Wang, Latham, N.Y."

Signed and Sealed this

First Day of March, 1994

Attest:

BRUCE LEHMAN

*Attesting Officer*     *Commissioner of Patents and Trademarks*